US008899659B2

(12) United States Patent
Angelo (10) Patent No.: US 8,899,659 B2
(45) Date of Patent: Dec. 2, 2014

(54) RECESS STEPS FOR CAB ACCESS (71) Applicant: Gerald J. Angelo, Bellevue, WA (US)

(72) Inventor: Gerald J. Angelo, Bellevue, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 13/787,511

(22) Filed: Mar. 6, 2013

(65) Prior Publication Data

US 2014/0252798 A1 Sep. 11, 2014

(51) Int. Cl.
*B60R 3/02* (2006.01)
*B62D 35/00* (2006.01)
*B60R 3/00* (2006.01)

(52) U.S. Cl.
CPC ............... *B62D 35/001* (2013.01); *B60R 3/00* (2013.01)
USPC ... 296/151; 296/198; 296/146.9; 296/190.01; 296/190.08; 296/190.11; 296/180.2; 280/163

(58) Field of Classification Search
USPC ................... 296/198, 146.9, 190.01, 190.04, 296/190.08, 190.11, 151, 180.1, 190.07, 296/180.2; 280/163
See application file for complete search history.

(56) References Cited

U.S. PATENT DOCUMENTS

| 2,163,323 | A | * | 6/1939 | Howe | 296/151 |
| 2,404,870 | A | * | 7/1946 | Ulrich | 296/198 |
| 3,887,227 | A | * | 6/1975 | Deckert | 296/187.12 |
| 4,813,736 | A | | 3/1989 | Schubert | |
| 4,836,568 | A | | 6/1989 | Preslik | |
| 4,925,235 | A | * | 5/1990 | Fingerle | 296/180.2 |
| 5,092,617 | A | | 3/1992 | Jones, Jr. | |
| 5,159,746 | A | * | 11/1992 | Saggese | 29/467 |
| 5,257,847 | A | | 11/1993 | Yonehara | |
| 5,538,265 | A | | 7/1996 | Chen | |
| 5,806,869 | A | * | 9/1998 | Richards | 280/163 |
| 5,947,520 | A | | 9/1999 | McHorse | |

(Continued)

FOREIGN PATENT DOCUMENTS

DE 1 020 534 B 12/1957
DE 10 2004 024 694 A1 12/2005

(Continued)

OTHER PUBLICATIONS

Invitation to Pay Additional Fees, mailed Jun. 3, 2014, issued in corresponding International Application No. PCT/US2014/020327, filed Mar. 4, 2014, 5 pages.

(Continued)

*Primary Examiner* — Joseph D Pape
(74) *Attorney, Agent, or Firm* — Christensen O'Connor Johnson Kindness PLLC (57) ABSTRACT

Vehicles are described including a cab having a door opening on a side thereof, a chassis that supports the cab, two or more steps leading to the door opening, each of which is supported by the cab or the chassis, wherein the steps are placed within the recesses in the cab or chassis, and a door connected to the cab, wherein the door fits within the door opening, and the door comprises a lower door extension having a lower edge that terminates near to an upper surface of a lowermost step, the lower door extension covers a majority of the one or more recesses, and the lower door extension extends outboard to match the outboard extension of a fender or exterior cab side panel to provide a coplanar transition from the fender to the door, or from the door to the exterior cab side panel, or both.

16 Claims, 7 Drawing Sheets

(56) References Cited

U.S. PATENT DOCUMENTS

| | | |
|---|---|---|
| D434,348 S | 11/2000 | Delashaw |
| 6,736,447 B2 | 5/2004 | Angelo |
| D532,731 S | 11/2006 | Angelo |
| 7,168,722 B1 | 1/2007 | Piotrowski |
| D539,704 S | 4/2007 | Angelo |
| D549,146 S | 8/2007 | Kieffer |
| D561,647 S | 2/2008 | Simons |
| D563,281 S | 3/2008 | Simons |
| D570,253 S | 6/2008 | Cunagin |
| D607,395 S | 1/2010 | Beigel |
| D632,224 S | 2/2011 | Peltola |
| 2008/0231079 A1 | 9/2008 | Grady |
| 2012/0056444 A1 | 3/2012 | Stimel |

FOREIGN PATENT DOCUMENTS

| | | |
|---|---|---|
| DE | 10 2011 106 220 B3 | 6/2012 |
| WO | 98/40241 A1 | 9/1998 |
| WO | 2007/123447 A1 | 11/2007 |

OTHER PUBLICATIONS

International Search Report and Written Opinion, mailed Aug. 5, 2014, issued in corresponding International Application No. PCT/US2014/020327, filed Mar. 4, 2014, 16 pages.

* cited by examiner

RECESS STEPS FOR CAB ACCESS

BACKGROUND

Aerodynamics is a prime consideration in the design of vehicles. There are several factors that contribute to the aerodynamic drag caused by friction of air flowing around the sides of a truck or vehicle. A key to minimizing drag is the reduction or elimination of turbulence.

In conventional semi-tractor vehicles, the transition between the front fenders and the chassis fairing is often fairly abrupt due to the cab access steps. This leads to airflow separation and increased drag. To minimize this effect, the access steps are often reduced in size and/or the steps are placed in shallow recesses in the vehicle body. This makes the steps more difficult to use.

To improve the aerodynamic performance of cab access steps, a number of concealed or deployable step designs have been proposed for semi-tractors. These designs employ mechanical linkages or actuators of various types to expose or extend steps from a compact or flush position upon opening the semi-tractor door to the cab. However, many of these systems are complex in nature due to the mechanisms.

In addition to the aerodynamic drag caused by access steps, the interface between the cab and chassis also contributes to the aerodynamic drag of the vehicle. In conventional semi-tractors, this interface is typically a horizontal gap created between the bottom edge of the cab and the top of the chassis. Air is drawn into the horizontal gap, which then exits the rear of the cab and into the gap between the cab and semi-trailer. The air hitting the front of the semi-trailer causes increased aerodynamic drag.

SUMMARY

Vehicles are described wherein some vehicles may include a cab having a door opening on a side thereof, a chassis that supports the cab, two or more steps leading to the door opening, each of which is supported by the cab or the chassis, wherein the two or more steps are placed within one or more recesses in the cab or chassis, and a door connected to the cab, wherein the door fits within the door opening, and the door comprises a lower door extension having a lower edge that terminates near to an upper surface of a lowermost step, the lower door extension covers a majority of the one or more recesses, and the lower door extension extends outboard to match the outboard extension of a fender or exterior cab side panel to provide a coplanar transition from the fender to the door, or from the door to the exterior cab side panel, or both.

Some of the vehicles may include a gap created between a lowermost edge of an exterior cab side panel on the cab and a fairing on the chassis, wherein the gap extends along the side of the cab and chassis fairing at least from the rear of the lower door extension to an end of the cab, and the gap is angled greater than 0 degrees with respect to a horizontal direction.

In some vehicles, a width of the gap is sized to approximately match the distance that the cab may travel with respect to the chassis.

In some vehicles, the chassis includes a fender that extends outboard, the lower door extension extends outboard to match the outboard extension of the fender, and the leading edge of the lower door extension is curved inboard where the fender recedes behind the lower door extension.

In some vehicles, the outboard extensions of the fender, the lower door extension, and the chassis fairing are coplanar.

In some vehicles, the cab may further include a side panel separable from and placed to the rear of the lower door extension, and is juxtaposed next to the door and extends outboard to be coplanar with the lower door extension.

In some vehicles, the cab includes an exterior cab side panel that extends below the top of the chassis fairing, and the chassis fairing curves inboard where the chassis fairing recedes behind the exterior cab side panel.

In some vehicles, the cab includes a recess comprising an upper step, and the chassis includes a recess comprising a lower step.

In some vehicles, the recess for the upper step is formed from an exterior cab side panel, and the recess for the lower step is formed from a fairing supported on the chassis.

In some vehicles, the chassis fairing includes a front fender portion, a recess portion for a step, and a main fairing for the chassis.

In some vehicles, the cab can move independently from the chassis.

Some vehicles are semi-tractors.

Some vehicles include a cab having an exterior side panel, a chassis that supports the cab, wherein the cab can move independently of the chassis, and wherein the chassis has a fairing, and the exterior side panel has a lower edge that extends below the fairing, and creates a gap that allows the cab to move independent of the chassis without hitting the chassis fairing.

In some vehicles, the gap has an angle greater than 0 with respect to a horizontal direction.

In some vehicles, the exterior cab side panel extends outboard, the chassis extends outboard, and the outboard extension of the exterior cab side panel is coplanar with the outboard extension of the chassis fairing.

In some vehicles, the chassis fairing is curved inboard where the chassis fairing recedes behind the exterior cab side panel.

Methods are disclosed for reducing aerodynamic drag of a vehicle.

In some methods, reducing the aerodynamic drag of a vehicle includes providing a door to the rear of a fender, wherein the door has a leading edge that curves inboard where the fender recedes behind the leading edge of the door.

In some methods, reducing the aerodynamic drag of a vehicle includes providing an exterior cab side panel that extends below a chassis fairing and providing an inboard curvature on the chassis fairing where the chassis fairing recedes behind the exterior cab side panel.

In some methods, reducing the aerodynamic drag of a vehicle includes providing a fender that extends outboard, providing a lower door extension that extends outboard, wherein a majority of the fender and a majority of the lower door are coplanar, and the leading edge of the door is curved inboard where the fender recedes behind the door.

In some methods, the vehicle includes a fender formed on a fairing supported on a chassis, and the door is supported by a cab, wherein the cab moves independently from the chassis, and the leading edge of the door and the fender are separated by a gap that is approximately the size of the amount of movement allowed between the cab and chassis.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Approximately half of the energy used to propel a long haul semi-tractor-trailer is expended to overcome aerodynamic drag. A significant portion of this drag is due to turbulent airflow around the lower sides of the vehicle. To reduce these turbulences, chassis fairings have been added to cover the fuel tanks and other chassis components.

Cab access steps are required to enter the driver's cab. The cab access steps are typically placed in recesses in the chassis fairings and/or the steps are of reduced depth or they extend out from the fairing surface into the air stream. All of these configurations contribute to turbulent airflow rather than reduce it. In addition, some of these step designs can be difficult to use due to poor visibility and reduced size of the steps. The interface between the chassis fairings and the bottom of the cab is another area that contributes to the aerodynamic drag. This interface is typically a horizontal gap to allow for cab movement relative to the chassis. The gap is horizontal and therefore is in line with the airflow allowing air to be drawn underneath the cab or between the cab and chassis, and flow into the low pressure area between the cab back wall and the front of the trailer. This air impacts the front of the trailer, causing additional drag.

In vehicles, such as semi-tractors, turbulence can be caused by the cab access steps, the transition from the front fender as it joins with the chassis fairing, and the interface between the cab and the chassis fairing. Aspects of the disclosed vehicles can address some of these issues.

In some of the embodiments, a vehicle is provided with a gradual and smooth transition from the front fender to the cab door and chassis fairing. In some of the embodiments, a vehicle has steps that are covered with a lower door extension that requires no additional mechanisms or actuators to expose the steps when the door is opened. This configuration reduces the complexity and allows large, easy to see and use steps. In addition to the aerodynamic effects by concealing the steps, the lower door extension also shields the steps from road spray and provides increased security by making it difficult for carjackers to climb onto the cab.

In some embodiments of the vehicles, aerodynamic performance is improved by providing curves and/or bends in the gap between the cab skirt and the chassis fairing. The angled configuration restricts the air from flowing into the gap and, therefore, directs more air around the vehicle to avoid the air hitting the front of the trailer.

Figure 1:
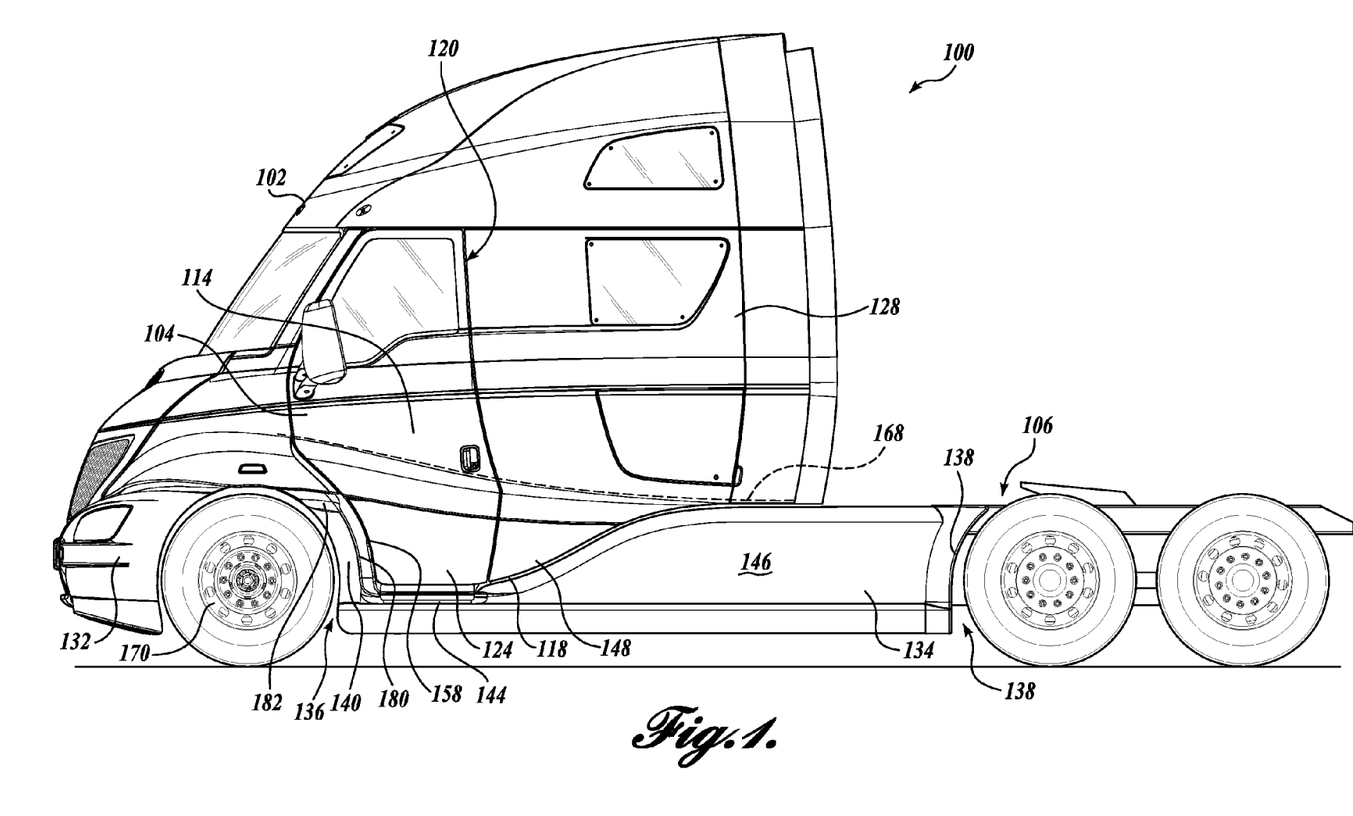
FIG. 1 is a diagrammatical illustration of a semi-tractor having a lower door extension to cover access steps to a cab and a curved gap between the cab and chassis.

Referring to FIG. 1, a semi-tractor 100 having a lower door extension 124 to cover cab access steps leading to the inside of the cab 102 and a curved gap 118 between the cab 102 and chassis 106 is illustrated. A semi-tractor is used as a representative vehicle to illustrate the various embodiments and is not meant to be limiting of the vehicles.

Semi-tractors can be distinguished from other vehicles by any one or more of the following features. It is to be appreciated that other vehicles, not normally considered semi-tractors, may also include one or more of these features as well. Semi-tractors may include three or more wheel axles, wherein one front axle is the steering axle, and one or both rear axles are drive axles. Semi-tractors may include a driver's cab enclosure that is supported on a suspension mechanism, in addition to the wheel suspension on the chassis. Therefore, the cab may move independently of the chassis. Semi-tractors may have the engine mounted generally in front of or underneath the cab. Semi-tractors may include cabs that are positioned above the engine and/or transmission. Semi-tractors may be capable of being repositioned from a riding position to an elevated position to allow access to the engine and/or transmission. Semi-tractors generally do not include a cargo box or cargo bed on the chassis, and instead include a hitch positioned forward of the rearmost wheel axel. This allows the semi-tractors to interchange trailers, or to be quickly decoupled from a trailer once the semi-tractor-trailer arrives at the unloading destination. Thus, allowing for more efficient handling of cargo transportation, as the semi-tractor need not wait for the trailer to be unloaded.

In the embodiment of FIG. 1, the vehicle 100 includes a cab 102 supported over a chassis 106. Not shown is the cab suspension mechanism that supports the cab 102 over the chassis 106. The cab suspension mechanism may allow the cab 102 and chassis 106 to move independently relative to each other. That is, the cab 102 may have additional suspension in order to provide a smoother ride for the driver. The cab 102 may be described as the driver enclosure containing the driver's chair, steering wheel, and controls for operating the vehicle. The cab 102 may be sealed to a certain extent from the exterior to prevent the intrusion of rain, road spray, cold or hot ambient air, and insects, for example. The cab 102 is accessed via a door opening 120 on one or both lateral sides of the cab 102. The door 104 is used to cover the door opening 120. The description herein is of a single lateral side of the vehicle 100, but it is to be appreciated that the opposite side is in all material respects similar to the side being described.

Figure 2:
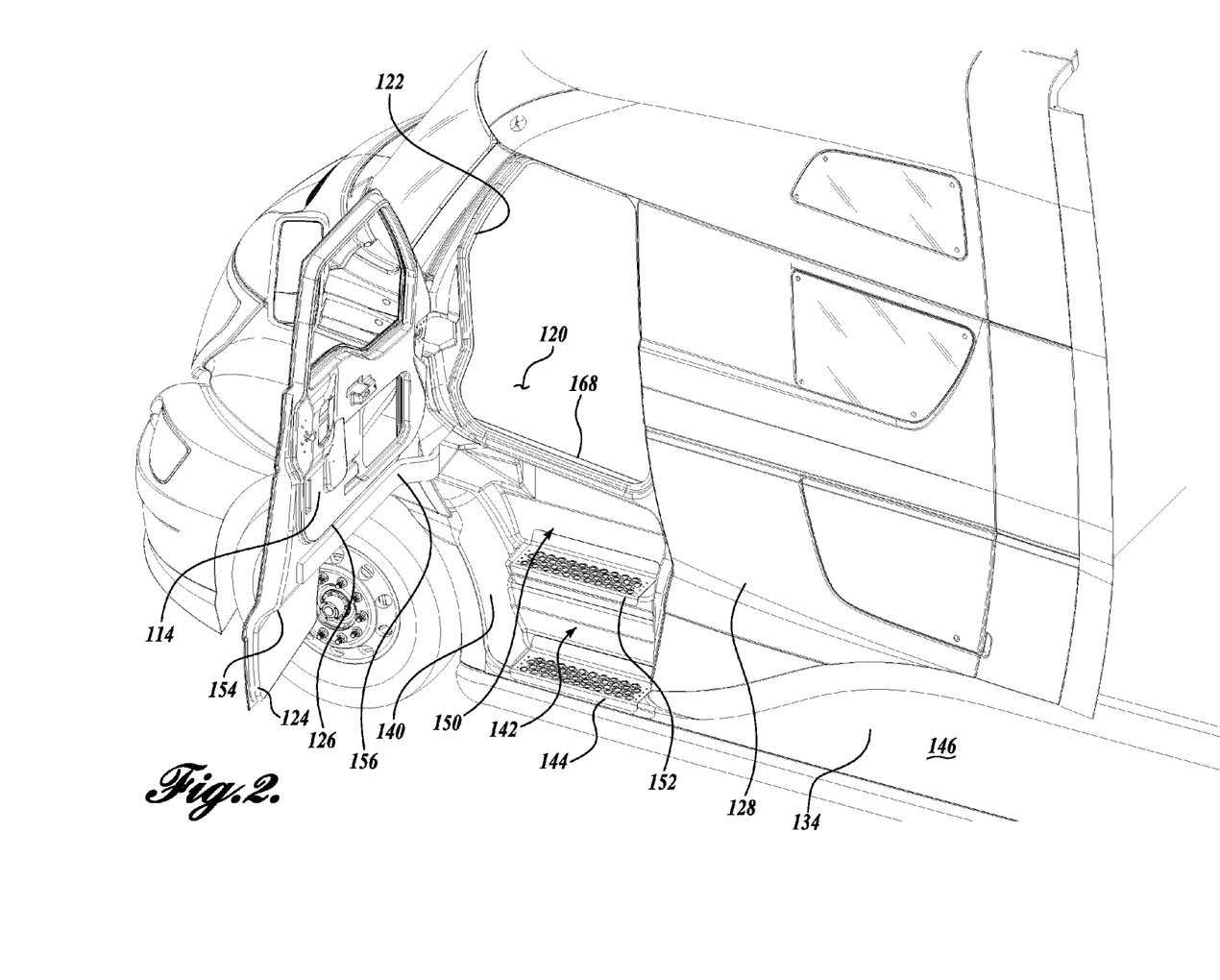
FIG. 2 is a diagrammatical illustration of recessed steps and a lower door extension.

Referring to FIG. 2, the door opening 120 may have a rubberized seal 122 extending around the exterior of the door opening 120 circumference. Additionally, or alternatively, the seal 122 may be placed on the inside surface of the door 104. In some embodiments of the vehicle 100, the door 104 may include a main door portion 114 and a lower door extension portion 124. The main door portion 114 may be constructed from one or more exterior panels on a door frame. The main door portion 114 is configured to include on the exterior, the door latch, the rearview mirror, the window frame, and window, for example. On the interior, as best seen in FIG. 2, the main door portion 114 includes a protrusion 126 generally matching the size and configuration of the door opening 120 circumference. The protrusion 126 provides space for the window, controls, and the like. The protrusion 126 may also include a rubberized seal that cooperates with the immediately adjacent surface next to the door opening 120. The door 104 includes a lower door extension 124. The lower door extension 124 is connected to the lower side of the main door portion 114. The lower door extension 124 can be the portion of the door 104 that is lower than the lowermost edge of the door opening 120. The lower door extension 124 may be, but is not necessarily, integral with the main door portion 114. The lower door extension 124 may be constructed from the same exterior and interior panels as the main door portion 114, or the lower door extension 124 may be constructed from a distinct and separable exterior and interior panels. However, in some cases, the lower door extension 124 may overlap with the main door portion 114.

The cab 102 further includes an exterior cab side panel 128 that can be made from one or more panels. It is to be appreciated that reference to the exterior cab side panel 128 includes reference to the plurality of the separate panels that may comprise it. The panel 128 surrounds the sides of the cab 102. The exterior cab side panel 128 may extend to and/or extend beneath the elevation of the cab floor 168. In referring to the portion or portions of the exterior cab side panel 128 that extend beneath the cab floor elevation, such exterior panel portions may be referred to as a "skirt" or "extension," such as extension 148 of the exterior cab side panel 128. Any skirt or extension 148 of the exterior cab side panel 128 may be integral with other panels or may be separate and distinct panels. Distinct panels may be advantageous in case the cab exterior is damaged and needs partial replacement. The exterior cab side panel 128 may include the exterior side of the cab 102 not covered by the door 104, including the main door portion 114 and lower door extension 124, but not including parts of the roof, hood, bumper, and fender.

The chassis 106 includes the underlying structural framework for supporting the main parts of the vehicle 100, including, but not limited to, the cab 102, engine (not shown), transmission (not shown), fuel tanks (not shown), wheel axles (not shown). The chassis 106 may include two or more parallel frame rails (not shown) extending substantially from the front to the rear of the vehicle 100. The frame rails may be tied together by interconnecting tie rails connecting the two frame rails. The chassis 106 may support a bumper 132 at the front of the vehicle 100. The chassis 106 can support a fairing 134. The fairing 134 is provided to shield the chassis and to improve the aerodynamic properties of the vehicle. The chassis fairing 134 extends from top to bottom covering the majority of the chassis. The fairing 134 also extends in the inboard to outboard direction. The chassis fairing 134 can generally extend from the front wheel well 136 to the forward one of the two rear wheel wells 138. The fairing 134 can be a single piece fairing or assembled from two or more fairing pieces. It is to be appreciated that reference to chassis fairing 134 in the singular form also includes a fairing constructed from two or more fairing pieces. The fairing 134 may include a fender portion 140 located immediately to the rear of the front wheel 170. When viewed from the side, the fender portion 140 extends from front to back in an arc greater than the wheel radius. When viewed from the side, the fender portion 140 also extends outboard from the chassis 106 to about or slightly exceeding the outboard extension of the front wheel 170. The fender portion 140 has a curving surface as it recedes inboard into a recess 142 (best seen in FIG. 2). The recess 142 is generally an inboard formation of the fairing 134. That is, the recess 142 is pushed inboard with respect to the majority of the fairing 134. The chassis fairing 134, including the fender 140 and recess 142 can be rigidly connected to the chassis 106, which is independently movable from the cab 102 including the door 104 and exterior cab side panel 128. Because the cab 102 should be allowed to move independent of the chassis 106, the fairing 134 (including fender 140 and recess 142) is also independent from the exterior cab side panel 128 and the door 104, at least to the extent that the exterior cab side panel 128 and the door 104 move with the cab 102, while the fairing 134, which is connected to the chassis 106, does not.

Referring to FIG. 2, the recess 142 is positioned to the rear of the fender 140 and forward of the main fairing portion 146. The main fairing portion 146 can cover the chassis 106 beginning from the rear of the door 104 to the front of the rear wheel. Also seen in FIG. 2 is an upper recess 150 placed to the rear of the fender 140. The lower recess 142 and upper recess 150 are used for mounting a lower and upper cab access step, 144, 152, respectively, in the lower 142 and upper recess 150. However, the lower recess 150 is formed from the chassis fairing 134, and the upper recess is formed from the exterior cab side panel 128.

Figure 3:
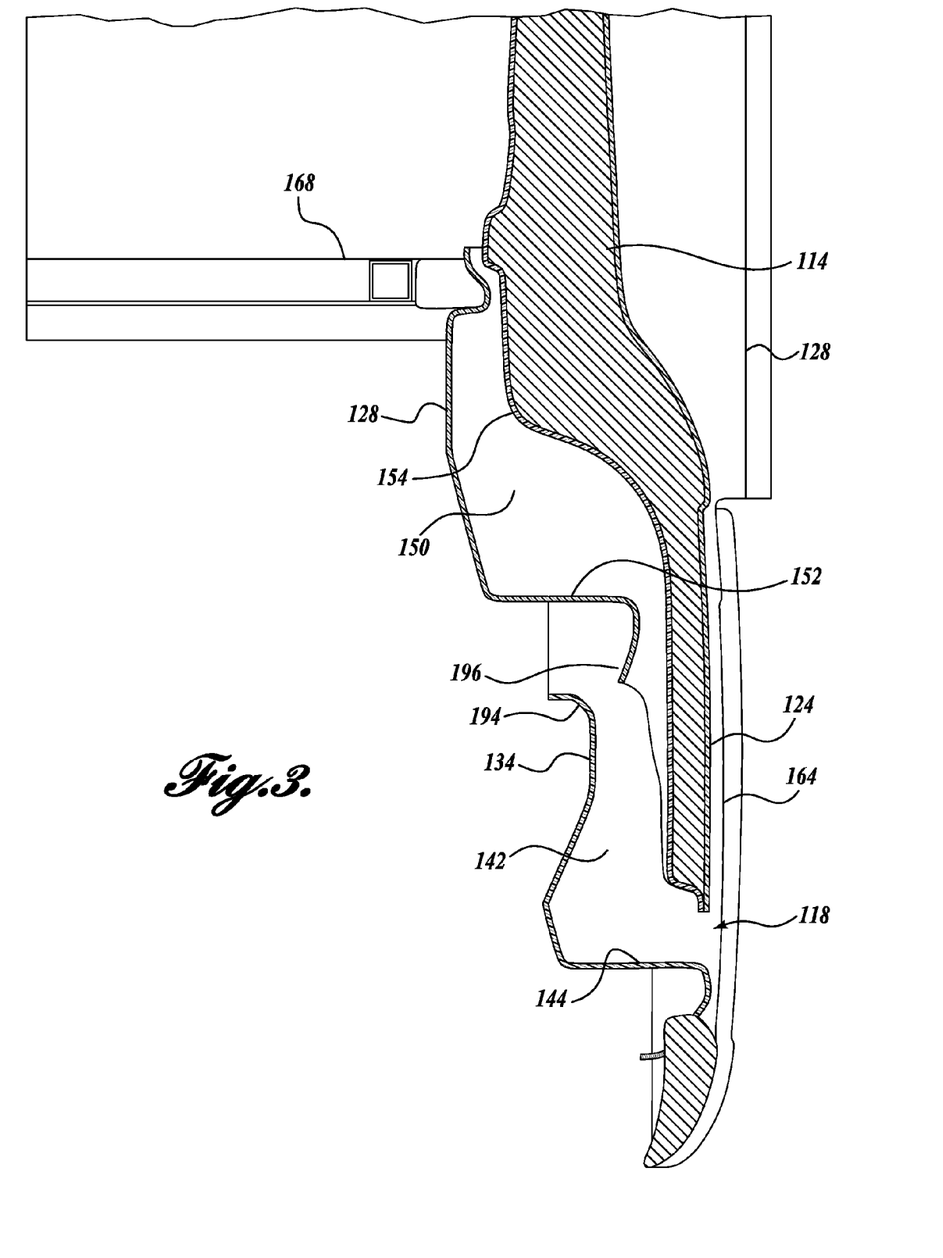
FIG. 3 is a cross sectional diagrammatical side view illustration of the recessed steps and lower door extension of FIG. 2.

Referring to FIG. 3, the lower step 144 is seen more clearly resting on the horizontal surface built into the recess 142 formed from the chassis fairing 134. The step 144 can include a metal plate with a non-slip surface, such as perforations with upward extending rims. The inboard side surface 194 of the recess 142 can extend upward and then curve under the lower edge 196 of the exterior cab side panel 128, which forms the upper recess 150. When viewed from the side as in FIG. 2, the recess 150 follows the curve of the fender 140 as it extends adjacent to it, and then extends horizontally across to form a support for the upper step 152. Referring back to FIG. 3, the exterior cab side panel 128 has an inboard side surface that extends upwards to the cab floor 168 to create the upper access step recess 150, and the exterior cab side panel 128 also extends outboard to create a second horizontal surface and upper step 152, which then finishes in the curved lower edge 196 adjacent to the inboard curving side surface 194 of the lower recess. To allow for independent movement of the cab 102 relative to the chassis 106, the lower edge 196 of the exterior cab side panel 128 is separated by a gap from the curved inboard edge 194 of the fairing 134. Such gap can exist where the lower edge of the exterior cab side panel 128 terminates adjacent to the chassis fairing 134. The step 152 can include a metal plate with a non-slip surface, such as perforations with upward extending rims. In some embodiments, the outboard edge of the lower step 144 may be offset or extend outboard from the outboard edge of the upper step 152. However, in other embodiments, the lower 144 and upper 152 steps may be at the same outboard location. In some embodiments, the recess 142 and lower step 144 are formed from the fairing 134 connected to the chassis 106, and the recess 150 and upper step 152 are formed from the exterior cab side panel 128. However, in other embodiments, the recess 142 and lower step 144 may be formed from the exterior cab side panel 128, or, in still other embodiments, the recess 150 and upper step 152 may be formed from the chassis fairing 134. That is, either or both steps 144 and 152 may be formed on the chassis fairing 134 or the exterior cab side panel 128.

As seen in FIG. 2, the door lower extension 124 on the interior extends downward from the main door portion 114. The interface between the lower door extension 124 and the main door portion 114, on the interior, includes a ridge 154 extending generally the width of the door 104. The ridge 154 continues downward below the cab floor 168 elevation, and fills a portion of the recess 150. The ridge 154 supports a gooseneck hinge 156 through which the door 104 can be attached to the cab 102 at the front edge of the door 104. In the illustrated embodiment, the gooseneck hinge 156 is used as a lower hinge. This allows the door 104 to swing out over the outboard-extending fender 140 as the door 104 is opened. The gooseneck hinge 156 can be positioned below the cab floor 168 to prevent intrusion into the floor structure or interior space of the cab 102. A large recessed pocket can be provided below the cab floor 168 for the gooseneck hinge 156 to reside in when the door 104 is closed. The gooseneck hinge 156 is used primarily because the fender 140 extends outboard from the cab 102 in the case when the cab 102 is narrower than the chassis 106 (when viewed from the front). As in the case just described, in some embodiments of the vehicle 100, the width of the majority of the cab 102 when viewed from the front can be less than the width of the chassis 106 and fairing 134 (except as noted herein). However, in other embodiments, the width of the majority of the cab 100 (when viewed from the front) may be same as the width of the chassis with fairing 134.

Referring to FIG. 2, when viewed from the front, the lower door extension 124 extends outboard from the main door portion 114 to clear the outboard edge of the upper step 152. However, in other embodiments, such as when the cab 102 is made as wide as the chassis 106, the lower door extension 124 and main door portion 114 can both extend outboard the same amount. The lower door extension 124 extends below the upper step 152 to cover a majority of the lower access step recess 142 in the fairing 134. That is, there is an amount of vertical overlap of the lower door extension 124 with the chassis fairing 134 that is enough to cover a majority of the lower recess 142. The lower door extension 124 therefore presents a smooth outboard surface for airflow to improve the aerodynamics of the vehicle 100. In some embodiments, the lower edge of the lower door extension 124 extends outboard to match the outboard edge of the lower step 144, but is above the horizontal upper surface of the lower step 144. The distance between the lower edge of the lower door extension 124 and the upper surface of the lower step 144 forms the gap 118, which will be described in more detail below. The gap 118 may only be wide enough to permit the cab 102 and lower door extension 124 to travel on the cab suspension without the lower door extension 124 hitting the top of the lower step 144.

Referring to FIG. 1, it can be seen that the lower door extension 124 extends sufficiently to conceal at least the upper access step recess 150 and upper step 152 and a majority of the lower access step recess 142, while the outboard edge of the lower step 144 remains visible. Because of the lower door extension 124 extending outboard, the lower and upper steps can be offset from each other in a more ergonomically acceptable manner. Furthermore, concealment of the steps by the lower door extension 124 reduces the aerodynamic drag that would be created by the recesses 142 and 150.

Referring again to FIG. 1, in some embodiments of the vehicle 100, a non-horizontal, angled, or curved gap 118 is created between the lowermost edges of the exterior cab side panel 128 and door 104 and the chassis fairing 134. Rather than separating the cab from the chassis with a horizontal gap extending from front to rear of the cab, wherein such horizontal gap is near the top of the chassis frame rails as is commonly done, some embodiments of the vehicle 100 disclosed herein have the gap 118 that varies in elevation when separating the lower edge of the exterior cab side panel 128 and door 104 from the chassis fairing 134. The gap 118 can be a series of interconnecting gap sections.

In some embodiments, a visible gap 118 extends from the front wheel well 136 to the rear end of the cab 102. The gap 118 is needed to allow movement of the cab 102 in relation to the chassis 106. The gap corresponds generally to and can be slightly larger than the allowed suspension travel between the cab 102 and chassis 106 to avoid the lower edge of the exterior cab side panel 128 and door 104 hitting the chassis fairing 134. In some embodiments, where the door leading edge ends adjacent to the fender 140 to create the gap 118, the leading edge can be curved inboard. In some embodiments, where the chassis fairing 134 is provided adjacent to the lower edge of the exterior cab side panel 128 at the gap 118, the chassis fairing 134 can be curved inboard.

Figure 4:
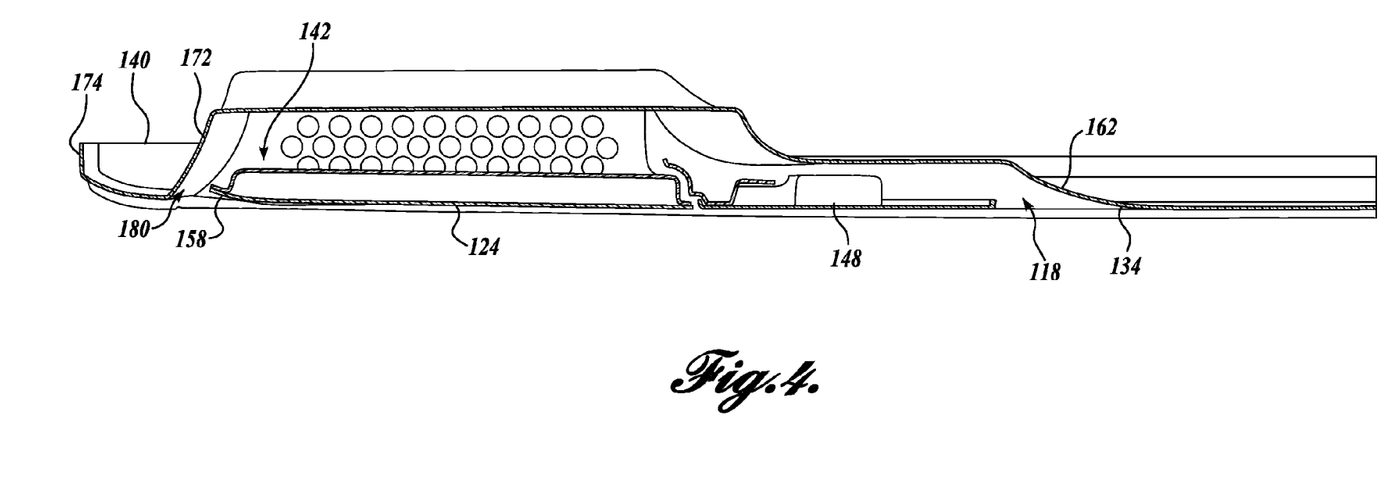
FIG. 4 is a cross sectional diagrammatical top view illustration of the recessed steps and lower door extension of FIG. 2.

As seen in FIG. 1, the gap 118 can include a gap section 182 that begins at an elevation near the top of the frame rails at the front of the cab 102. The gap section 182 is essentially horizontal or slightly angled down, and traverses the top of the fender 140, and the hood section in front of the door 104. The horizontal gap section 182 connects to a gap section 180 that is created by the leading edge 158 of the lower door extension 124 and the rear section 172 of the fender 140, as best seen in FIG. 4. The gap section 180 created by the fender 140 and the leading edge 158 of the lower door extension 124, when viewed from the side, generally arcs downwardly to an elevation corresponding to the height of the upper surface of the lower step 144. The gap section 180 then makes a 90 degree turn toward the rear of the cab 102 and connects with the gap section 118 described above separating the lower edge of the door lower extension 124 and the upper surface of the lower step 144. Behind the rear of the door lower extension 124, the gap 118 makes a soft curve upward. This section of the gap 118 is formed by the lower edge of the exterior cab side panel extension 148 that is mounted on the cab 102 and to the rear of the lower door extension 124, but separated from the lower door extension 124. The exterior cab side panel extension 148 is below the cab floor 168. The exterior cab side panel extension 148 is also extended outboard at a lower portion thereof to match the exterior surface of the door lower extension 124. The exterior cab side panel extension 148 curves outboard to inboard to join with the remainder of the exterior cab side panel 128. The gap 118 continues to rise slightly past the exterior cab side panel extension 148, and then the gap 118 levels off, and then continues substantially horizontally to the end of the rear of the cab 102. This rear section of the gap 118 is created by the lower edge of the exterior cab side panel 128 and the chassis fairing 134.

The gap 118 as described above is achieved generally by extending the bottom of the door 104 via the door lower extension 124 and the exterior cab side panel 128 via the side panel extension 148 down to the gap location. The door and cab extensions are not only extended to be lower, but are also extended outboard so that the surface of the outboard extension of the front fender surfaces to the door and cab provide a smooth transition for air flowing across the side of the vehicle. That is, the outboard surfaces of the lower door extension 124, the fender 140, the exterior cab side panel extension 148, and the chassis fairing 134 can be substantially coplanar with each other. Coplanar outboard surfaces means that the smooth cab side profile is presented to the air flowing around the side of the cab.

As can be appreciated from the description of the gap 118, the majority of the gap 118 is not horizontal. Instead, the gap 118 includes one or more curves or is at an angle greater than 0 degrees with respect to horizontal. The curved gap 118 provides an aerodynamic benefit. In conventional cab enclosures, the cab is separated from the chassis via a horizontal gap which is in line with the direction of airflow. That is, the air flowing by the sides of the cab is horizontal, and the angle between the direction of airflow and the horizontal gap is essentially 0 degrees. This allows air to be drawn into the horizontal gap and causes additional drag by hitting the front of the trailer. With an angled gap having one or more sections that are at an angle greater than 0 degrees with respect to horizontal, the airflow crosses the gap rather than flowing into it. This reduces the volume of air being drawn into the low pressure area between the rear of the cab and the front of the trailer, thereby reducing the aerodynamic drag. Thus, by making the gap between the cab and the chassis have angles of greater than 0 degrees with respect to the air flowing around the cab, such that the air flow and gap are not aligned in the same direction, the aerodynamic performance may be improved. Furthermore, the gap can be as wide or slightly wider than the distance that the cab suspension system may travel.

Referring to FIG. 4, other aspects for improving the aerodynamics of the vehicle 100 will be described. The fender 140 is extended outboard, and the exterior surface of the lower door extension 124 is also similarly extended outboard to match the outboard extension of the exterior surface of the fender 140. That is, the outboard surface of the fender 140 is coplanar with the outboard surface of the lower door extension 124. Additionally, the fender 140, which is formed from the chassis fairing 134, curves inboard at the rear end 172 to form the lower step recess 142. The lower door extension 124 has a leading edge 158 that when viewed from the top as in FIG. 4, is curved inboard of the outboard extension of the fender 140, while the fender 140 recedes inboard. The lower door extension 124 while being separated from the chassis 106 acts as a continuation of the front fender 140 exterior surface, thus providing a smooth transition for air flowing across the vehicle 100. Also, the front leading edge 174 of the fender 140 is curved inboard, as best seen in FIG. 4, to reduce turbulence of air flowing across the front wheel. The vehicle's 100 aerodynamics are further improved by the inboard curvature of the chassis fairing 134 at location 162, as best seen in FIG. 4. The inboard curvature at location 162 reduces turbulence of the air flowing across a section of the exterior cab side panel extension 148. Similar to the leading edge of the lower door extension, when the chassis fairing 134 meets the edge of the gap 118 the chassis fairing 134 can curve inboard as shown in FIG. 4 at location 162 where it recedes behind the exterior cab side panel extension 148. This inboard curvature, like the lower door extension leading edge curvature, aids in the reattachment of the air flowing across the cab side panel extension 148 and prevents additional tripping of the airflow. Similar inboard curvature of the fairing 134 can be provided along the gap 118, where the exterior cab side panel 128 extends down to the gap 118, and the fairing 134 recedes behind the panel 128. The inboard curvature of the front fender 140 at location 174, the inboard curvature of the lower door extension 124 at location 158, and the inboard curvature of the chassis fairing 134 at location 162 allow the reattachment of the airflow coming off the front wheel opening in the case of the fender 140 and to the rear of the door 104. The inboard curvature prevents the leading edges of the fender 140, lower door extension 124, and fairing 134 from catching or tripping the air, which would cause increased turbulence and increased drag.

Figure 5:
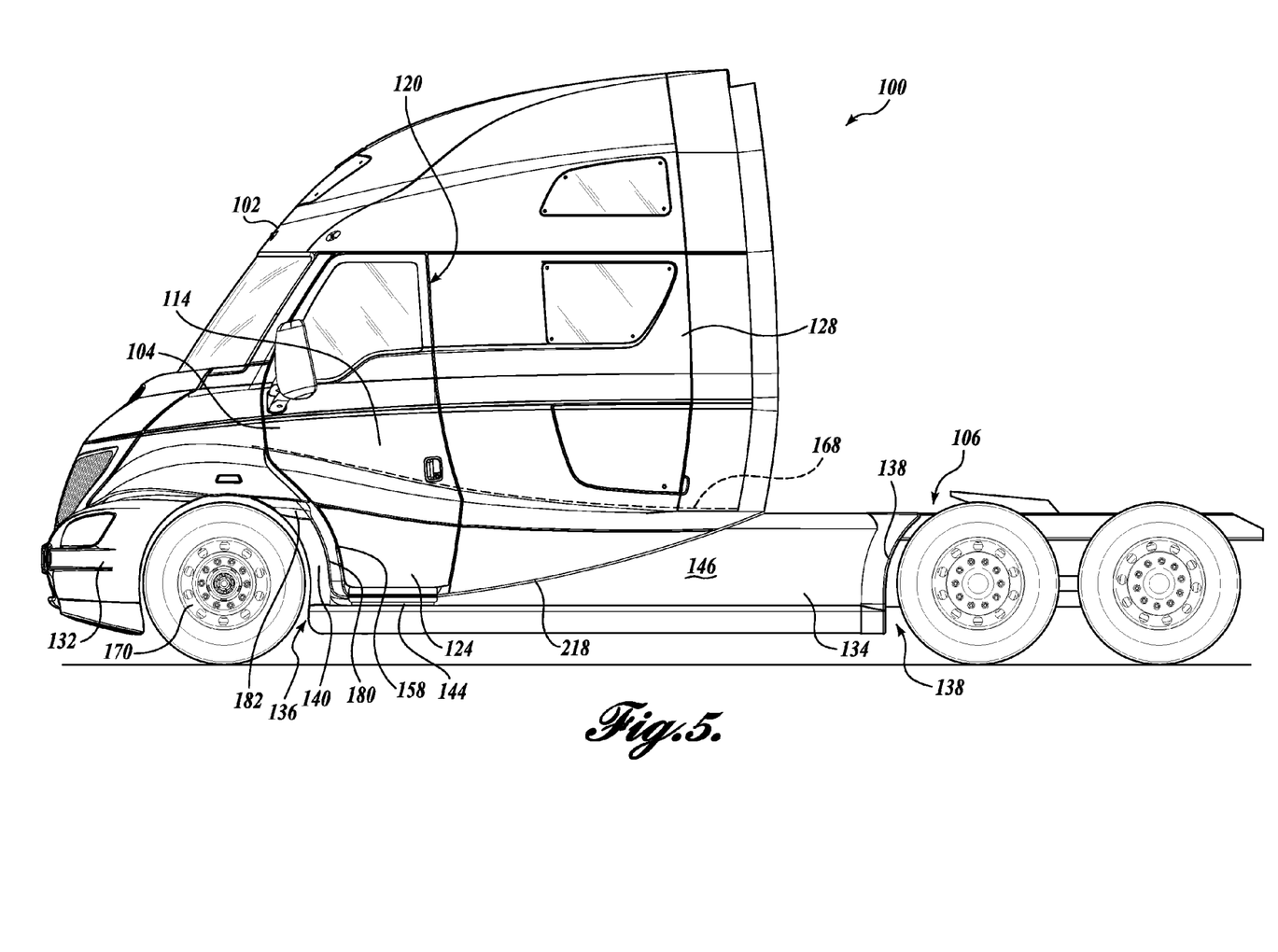
FIG. 5 is a diagrammatical illustration of a semi-tractor having a lower door extension to cover access steps to a cab and a curved gap between cab and chassis.

Referring to FIG. 5, another embodiment of a vehicle 100 is illustrated where like numbers represent like parts as those illustrated in FIG. 1, except for the changes noted below. In the embodiment of FIG. 5, however, the gap 218 has a different configuration than the gap 118 illustrated in FIG. 1. In FIG. 5, instead of the gap having a horizontal section at the rear of the cab as in FIG. 1, the gap 218 is essentially an angled line extending from the rear of the lower door extension 124 to the rear of the cab 102 to minimize any horizontal sections of gap. The gap 218 is created by extending the lower edge of the exterior cab side panel 128 to give a straight upward sloping profile, and adding a corresponding inboard curvature to the chassis fairing 134 to allow the lower edge of the exterior cab side panel 128 to extend lower and outboard to be coplanar with the lower door extension 124 and fender 140. In one embodiment, the exterior cab side panel 128 can extend to the lower edge of the vehicle, which may eliminate the need for a chassis fairing.

Figure 6:
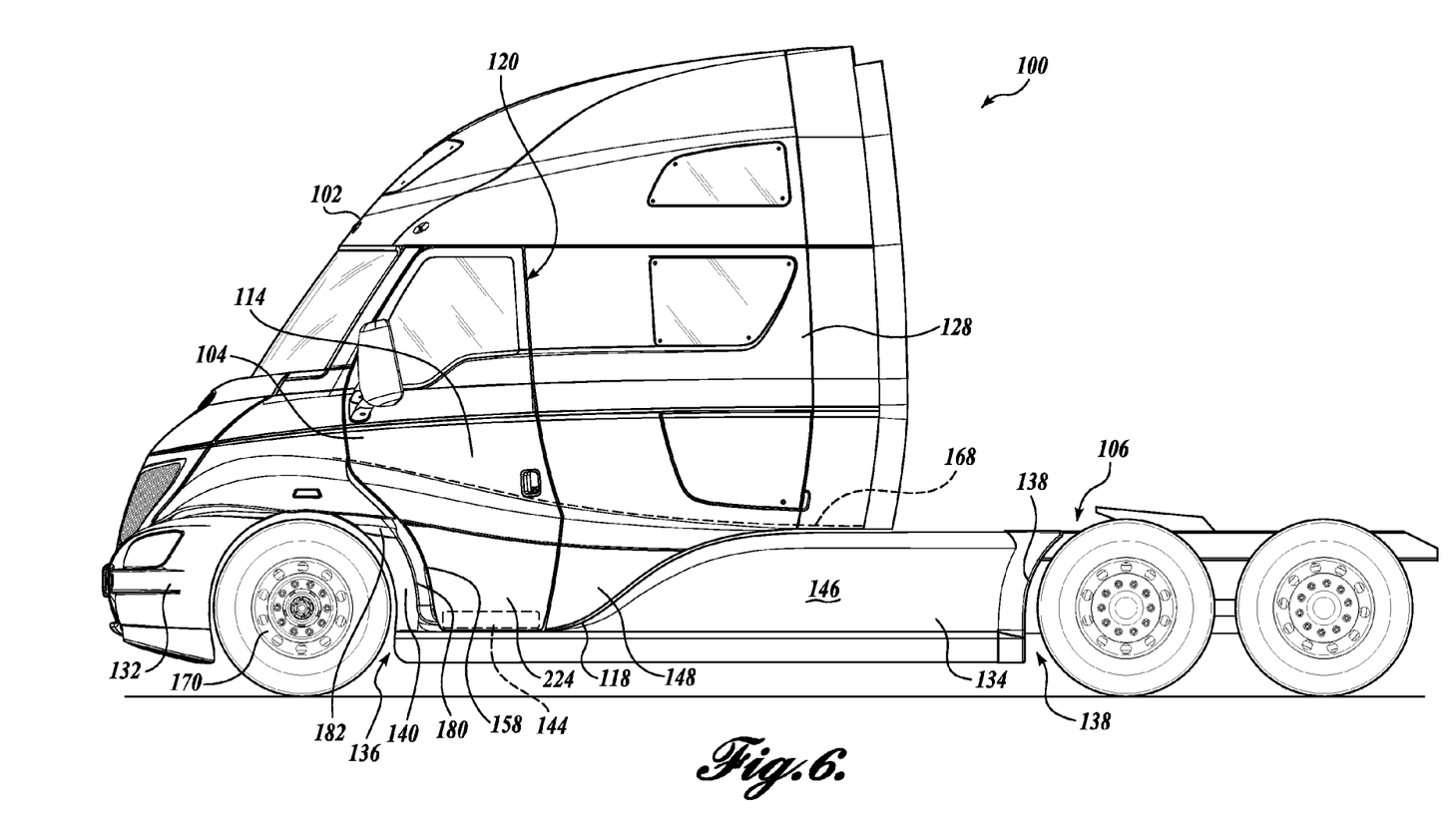
FIG. 6 is a diagrammatical illustration of a semi-tractor having a lower door extension to cover access steps to a cab and a curved gap between cab and chassis.

Referring to FIG. 6, another embodiment of a vehicle 100 is illustrated where like numbers represent like parts as those illustrated in FIG. 1, except for the changes noted below. The vehicle 100 of FIG. 6 has a lower door extension 224 that extends past the outboard edge of the lower step 144. The outboard edge of the lower step 114 may be brought inboard to allow the lower door extension 224 to extend past the outboard edge of the lower step 144. This hides the outboard edge of the step 144 behind the lower door extension 224. The lower step 144 can be moved inboard, or the fender 140, the lower door extension 224, and the exterior cab side panel 128 can be extended further outboard. The lower door extension 224 may even be extended to eliminate any gap below the lower door extension 224. The chassis fairing 134 may be provided with an inboard curvature at the lower door extension to permit the door to extend below the lower step 144.

Figure 7:
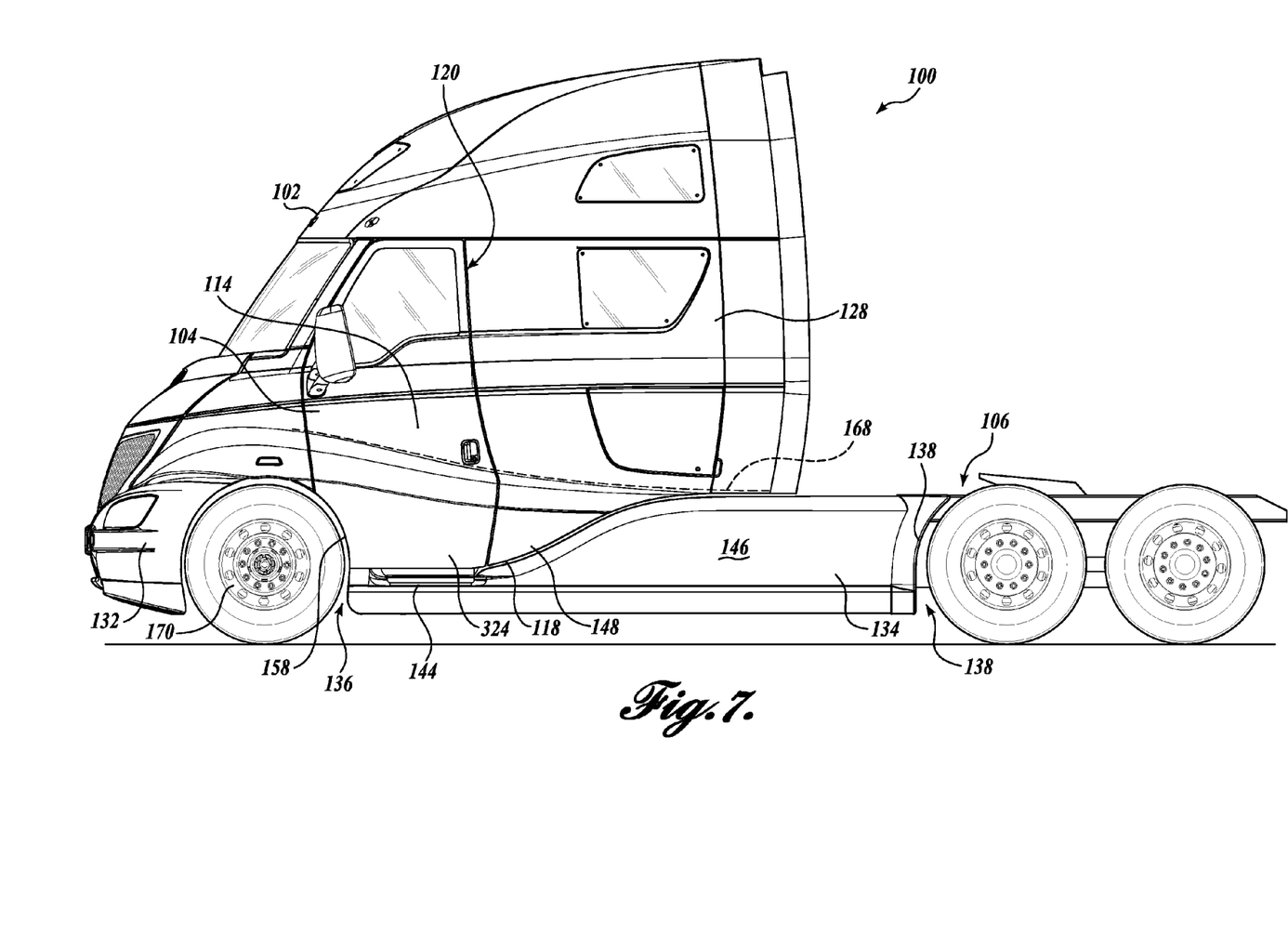
FIG. 7 is a diagrammatical illustration of a semi-tractor having a lower door extension to cover access steps to a cab and a curved gap between cab and chassis.

Referring to FIG. 7, another embodiment of a vehicle 100 is illustrated where like numbers represent like parts as those illustrated in FIG. 1, except for the changes noted below. In the embodiment of FIG. 1, a gap 180 is present between the fender 140 and the leading edge 158 of the lower door extension 124. In the embodiment of FIG. 7, the gap 180 has been eliminated by moving the leading edge 158 of the lower door extension 324 forward to occupy the area previously occupied by the fender 140. That is, the lower door extension 324 may be shaped to include a fender, or the fender extending from the chassis fender may be hidden beneath the lower door extension 324.

In some embodiments of the vehicle 100, the vehicle 100 includes a cab 102 having a door opening 120 on a side thereof, a chassis 106 that supports the cab 102, two or more steps 144, 152 leading to the door opening 120, each of which is supported by the cab 102 or the chassis 106, wherein the two or more steps are placed within one or more recesses 142, 150 in the cab 102 or chassis 106, and a door 104 connected to the cab 102, wherein the door 104 fits within the door opening 120, and the door 104 comprises a lower door extension 124, 224, 324 having a lower edge that terminates near to an upper surface of a lowermost step 144, the lower door extension 124, 224, 324 covers a majority of the one or more recesses 142, 150, and the lower door extension 124, 224, 324 extends outboard to match the outboard extension of a fender 140 or exterior cab side panel extension 148 to provide a coplanar transition from the fender 140 to the door 104, or from the door 104 to the exterior cab side panel extension 148, or both.

The vehicle 100 may further include a gap 118 created between a lowermost edge of an exterior cab side panel 128 on the cab 102 and a fairing 134 on the chassis 106, wherein the gap 118 extends along the side of the cab 102 and chassis fairing 134 at least from the rear of the lower door extension 124, 224, 324 to an end of the cab 102, and the gap 118 is angled greater than 0 degrees with respect to a horizontal direction for at least a majority of the length of the gap 118.

The vehicle 100 may include a gap 118, the width of the gap 118 is sized to approximately match the distance that the cab 102 may travel with respect to the chassis 106.

The vehicle's 100 chassis 106 may include a fender 140 that extends outboard, a lower door extension 124, 224 that extends outboard to match the outboard extension of the fender 140, and the leading edge 158 of the lower door extension 124, 224 is curved inboard where the fender 140 recedes behind the lower door extension 124, 224. For example, the fender 140 is constructed so that the rear side of the fender 140 recedes behind the leading edge 158 of the door 104 in an arc.

The vehicle 100 may include a fender 140, a lower door extension 124, 224, an exterior cab side panel extension 148, and a chassis fairing 134, such that the outboard extensions of each are coplanar. Coplanar outboard surfaces of any two or more of these pieces assist in reducing air turbulence and drag as the air flows over the cab side.

The vehicle's 100 cab 102 may include a side panel 148 separable from and placed to the rear of the lower door extension 124, 224, 324, and is juxtaposed next to the door 104 and extends outboard to be coplanar with the lower door extension 124, 224, 324.

The vehicle's 100 cab 102 may include an exterior cab side panel 128, 148 that extends below the top of the chassis fairing 134, and the chassis fairing 134 curves inboard at a location, such as location 162 in FIG. 4, where the chassis fairing 134 recedes behind the exterior cab side panel 128, 148.

The vehicle's cab 102 may include a recess 150 comprising an upper step 152, and the chassis 106 may include a recess 142 comprising a lower step 144. However, either the cab 102 or the chassis 106 may include both an upper and lower recess 150, 142.

The vehicle 100 has a recess 150 for the upper step 152 that is formed from an exterior cab side panel 128, and the recess 142 for the lower step 144 is formed from a fairing 134 supported on the chassis 106.

The vehicle's 100 chassis fairing 134 includes a front fender portion 140, a recess portion 142 for a step 144, and a main fairing 146 for the chassis 106. The main fairing portion generally extends from behind the door 104 to the front of the first rear wheel.

The vehicle's 100 cab 102 can move independently from the chassis 106. Accordingly, an angled gap 118 may be necessary to provide for movement between the cab 102 and chassis 106, such that the cab 102 will not hit parts of the chassis 106 when the cab 102 travels.

The vehicle 100 can be a semi-tractor.

In some embodiments of the vehicle 100, the vehicle 100 may include a cab 102 having an exterior cab side panel 128, a chassis 106 that supports the cab 102, wherein the cab 102 can move independently of the chassis 106, and wherein the chassis 106 has a fairing 134, and the exterior cab side panel 128, 148 has a lower edge that extends below the fairing 134, and creates a gap 118 that allows the cab 102 to move independent of the chassis 106 without hitting the chassis fairing 134, wherein the gap separates the lower edge from the chassis fairing, and the gap has an angle greater than 0 with respect to a horizontal direction.

In the vehicle 100, the gap 118 can extend from behind the door 104 to the rear of the cab 102.

The vehicle 100 can have an exterior cab side panel 128, 148 that extends outboard, the chassis 106 can extend outboard, and the outboard extension of the exterior cab side panel 128, 148 can be coplanar with the outboard extension of the chassis fairing 134.

The vehicle 100 can have a chassis fairing 134 that is curved inboard at the location 162 where the chassis fairing 134 recedes behind the exterior cab side panel 128, 148.

In addition to vehicles, methods for reducing the aerodynamic drag of the vehicle 100 are described.

In one embodiment, a method for reducing the aerodynamic drag of the vehicle 100 includes providing a door 104 to the rear of a fender 140, wherein the door 104 has a leading edge 158 that curves inboard along the rear of the fender 140 where the fender 140 recedes behind the leading edge 158 of the door 104.

In one embodiment, a method for reducing the aerodynamic drag of the vehicle 100 includes providing an exterior cab side panel 128, 148 that extends below a chassis fairing 134 and providing an inboard curvature 162 on the chassis fairing 134 where the chassis fairing 134 recedes behind the exterior cab side panel 128, 148.

In one embodiment, a method for reducing the aerodynamic drag of the vehicle 100 includes providing a fender 140 that extends outboard, providing a lower door extension 124, 224 that extends outboard, and a majority of the fender 140 and a majority of the lower door extension 124, 224 are coplanar.

In one embodiment, a method for reducing the aerodynamic drag of the vehicle 100 includes providing a lower step 144 within a recess 142 formed in a chassis fairing 134, providing an upper step 152 within a recess 150 formed in an exterior cab side panel 128, wherein the chassis fairing 134 is supported from a chassis 106, and the exterior cab side panel 128 is supported by the cab 102 that moves independent of the chassis 106, and providing a lower door extension 124, 224, 324 that covers a majority of the lower step recess 142, and the upper step recess 150, and the lower door extension 124, 224, 324 may extend outboard so that the outboard surface is coplanar with the outboard surface of a fender 140, the outboard surface of the exterior cab side panel 148, or the chassis fairing 134.

In one embodiment, a method for reducing the aerodynamic drag of the vehicle 100 includes providing a door 104 wherein the leading edge 158 of the door 104 extends to adjacent the rear of the front wheel 170 and arcs in a manner corresponding to the wheel radius, such that the leading edge 158 of the door 104 may form a fender for the front wheel 170.

In one embodiment, a method for reducing the aerodynamic drag of the vehicle 100 includes providing an exterior cab side panel 128 on the cab 102, and a fairing 134 on the chassis 106, wherein the lower edge of the exterior cab side panel 128 is separated from the fairing 134 by a gap 118, and the gap 118 extends from behind the door 104 of the vehicle 100 to the rear of the cab 102, and the gap 118 is at an angle greater than 0 with respect to a horizontal direction for all or a majority of the length of the gap 118. In one embodiment, the angle can even be 90 degrees with respect to the horizontal direction, in which case the gap 118 is present as a vertical gap, and is positioned at or near the cab 102 rear.

The methods for reducing the aerodynamic drag of the vehicle 100 may be combined into a single method. That is, all the ways of reducing the aerodynamic drag may be applied to any one vehicle 100. Additionally, the vehicle 100 of the foregoing methods can include a fender 140 that is formed on a fairing 134 supported on a chassis 106, and the door 104 is supported by a cab 102, wherein the cab 102 moves independently from the chassis 106, and the leading edge 158 of the door 104 and the fender 104 are separated by a gap 180 that is approximately the size of the amount of movement allowed between the cab 102 and chassis 106.

While illustrative embodiments have been illustrated and described, it will be appreciated that various changes can be made therein without departing from the spirit and scope of the invention.

The embodiments of the invention in which an exclusive property or privilege is claimed are defined as follows:

1. A vehicle, comprising:
a cab having a door opening on a side thereof;
a chassis that supports the cab;

two or more steps leading to the door opening, each of which is supported by the cab or the chassis, wherein the two or more steps are placed within one or more recesses in the cab or chassis;

a door connected to the cab, wherein the door fits within the door opening, and the door comprises a lower door extension having a lower edge that terminates near to an upper surface of a lowermost step, the lower door extension covers a majority of the one or more recesses, and the lower door extension extends outboard to match the outboard extension of a fender or exterior cab side panel to provide a coplanar transition from the fender to the door, or from the door to the exterior cab side panel, or both; and a gap is created between a lowermost edge of an exterior cab side panel on the cab and a fairing on the chassis, wherein the gap extends along the side of the cab and chassis fairing at least from the rear of the lower door extension to an end of the cab, and the gap is angled greater than 0 degrees with respect to a horizontal direction.

2. The vehicle of claim 1, wherein a width of the gap is sized to approximately match the distance that the cab may travel with respect to the chassis.

3. The vehicle of claim 1, wherein the chassis includes the fender that extends outboard, the lower door extension extends outboard to match the outboard extension of the fender, and the leading edge of the lower door extension is curved inboard where the fender recedes behind the lower door extension.

4. The vehicle of claim 1, wherein outboard extensions of the fender, the lower door extension, and the chassis fairing are coplanar.

5. The vehicle of claim 1, wherein the cab further comprises a side panel separable from and placed to the rear of the lower door extension, and that is juxtaposed next to the door and extends outboard to be coplanar with the lower door extension.

6. The vehicle of claim 1, wherein the cab includes an exterior cab side panel that extends below the top of the chassis fairing, and the chassis fairing curves inboard where the chassis fairing recedes behind the exterior cab side panel.

7. The vehicle of claim 1, wherein the cab includes a recess comprising an upper step, and the chassis includes a recess comprising a lower step.

8. The vehicle of claim 1, wherein the recess for the upper step is formed from an exterior cab side panel and the recess for the lower step is formed from a fairing supported on the chassis.

9. The vehicle of claim 1, wherein the chassis fairing includes a front fender portion, a recess portion for a step, and a main fairing for the chassis.

10. The vehicle of claim 1, wherein the cab can move independently from the chassis.

11. The vehicle of claim 1, wherein the vehicle is a semi-tractor.

12. A vehicle, comprising:

a cab having an exterior side panel; and a chassis that supports the cab, wherein the cab can move independently of the chassis, and wherein the chassis has a fairing, and the exterior side panel has a lower edge that extends below the fairing and creates a gap that allows the cab to move independently of the chassis without hitting the chassis fairing, wherein the gap separates the lower edge from the chassis fairing, and the gap has an angle greater than 0 degrees with respect to a horizontal direction, wherein the chassis fairing is curved inboard where the chassis fairing recedes behind the exterior cab side panel.

13. The vehicle of claim 12, wherein the gap extends from behind the door to the rear of the cab.

14. The vehicle of claim 12, wherein the exterior cab side panel extends outboard, the chassis extends outboard, and the outboard extension of the exterior cab side panel is coplanar with the outboard extension of the chassis fairing.

15. A method for reducing aerodynamic drag of a vehicle comprising a cab independently movably supported from a chassis, the method comprising:

providing a door rearwardly of a fender, wherein an outboard surface of the door is coplanar with an outboard surface of the fender, wherein the door has a leading edge that curves inboard of a trailing edge of the fender, and wherein the leading edge of the door and the trailing edge of the fender are separated by a gap to allow movement between the cab and chassis.

16. The method of claim 15, further comprising providing an exterior cab side panel that extends below a chassis fairing, and providing an inboard curvature on the chassis fairing where the chassis fairing recedes behind the exterior cab side panel.

* * * * *